(12) United States Patent  
Feder

(10) Patent No.: US 7,784,864 B2  
(45) Date of Patent: Aug. 31, 2010

(54) HOLDING DEVICE FOR AUTOMOBILES

(76) Inventor: Ron Feder, 5000 N. Pkwy. Calabasas #100, Calabasas, CA (US) 91302

( * ) Notice: Subject to any disclaimer, the term of this patent is extended or adjusted under 35 U.S.C. 154(b) by 40 days.

(21) Appl. No.: 12/270,255

(22) Filed: Nov. 13, 2008

(65) Prior Publication Data

US 2010/0117407 A1    May 13, 2010

(51) Int. Cl.
*A47C 7/62* (2006.01)
(52) U.S. Cl. .............. 297/188.06; 297/188.2; 297/188.03
(58) Field of Classification Search ......... 297/188.06, 297/188.01, 188.03, 188.04, 188.2, 188.05, 297/188.21; 248/274.1; 224/275
See application file for complete search history.

(56) References Cited

U.S. PATENT DOCUMENTS

| | | | |
|---|---|---|---|
| 2,705,122 | A | 3/1955 | Whitehead |
| 5,094,418 | A | 3/1992 | McBarnes, Jr. et al. |
| 5,383,588 | A | 1/1995 | Kazel |
| 5,482,239 | A | 1/1996 | Smith |
| 5,641,191 | A | 6/1997 | Jia |
| 5,678,741 | A | 10/1997 | Scheiber |
| 5,791,614 | A | 8/1998 | Sims |
| D441,202 | S | 5/2001 | Richter |
| 6,231,017 | B1 * | 5/2001 | Watkins ............ 248/274.1 |
| 6,260,750 | B1 | 7/2001 | Chiang |
| 6,315,180 | B1 * | 11/2001 | Watkins ............ 224/275 |
| 6,502,900 | B1 | 1/2003 | Johnston |
| 6,513,691 | B1 | 2/2003 | Edgerly |
| 6,554,357 | B2 | 4/2003 | Moffa |
| 6,586,071 | B1 | 7/2003 | Hanes |
| 6,601,914 | B1 * | 8/2003 | Seastrom ........... 297/188.06 |
| 6,863,252 | B2 | 3/2005 | Bosson |
| 7,070,237 | B2 | 7/2006 | Rochel |
| 7,111,814 | B1 | 9/2006 | Newman |
| 7,201,443 | B2 | 4/2007 | Cilluffo et al. |
| 7,364,230 | B2 * | 4/2008 | Zheng ............ 297/188.2 |
| 2002/0175254 | A1 | 11/2002 | Lee |
| 2004/0262474 | A1 | 12/2004 | Boks et al. |
| 2005/0006542 | A1 | 1/2005 | Hennige |
| 2005/0224669 | A1 | 10/2005 | Lin |

(Continued)

FOREIGN PATENT DOCUMENTS

FR    2639198    5/1990

(Continued)

*Primary Examiner*—Milton Nelson, Jr.
(74) *Attorney, Agent, or Firm*—Cislo & Thomas, LLP; Kelly W. Cunningham, Esq.

(57) ABSTRACT

A holder for personal effects in a vehicle comprising a base that fits around the support rods of a headrest, a mount that may adjustably connected to the base and designed to hold the strap or other hanging feature of one or more personal items, and at least one securement block that may be used to sure up the base, limit its ability to move laterally, or help it to support heavier items. The base may be detachable and reversible so that it can be used in combination with the headrest support rods of a seat on either side of the car and so that the arm can be positioned in a maximum number of variations for the convenience of the user. In some embodiments, one or more of the securement blocks is easily removable and re-attachable to the base to accommodate a large variety of headrest and support rod configurations.

24 Claims, 3 Drawing Sheets

U.S. PATENT DOCUMENTS

| | | |
|---|---|---|
| 2006/0032996 A1 | 2/2006 | Wu |
| 2006/0181116 A1 | 8/2006 | Lok |
| 2006/0243764 A1 | 11/2006 | Chiang |
| 2006/0255224 A1 | 11/2006 | Hsuing |
| 2007/0090251 A1 | 4/2007 | Padden |

FOREIGN PATENT DOCUMENTS

| | | | |
|---|---|---|---|
| GB | 2239639 A | * | 7/1991 |
| JP | 05337024 | | 12/1993 |
| WO | WO 00/30894 | | 6/2000 |

* cited by examiner

HOLDING DEVICE FOR AUTOMOBILES

TECHNICAL FIELD

This invention relates to an adjustable holding device for automobiles for holding personal effects.

BACKGROUND

Drivers and passengers in an automobile almost always carry some personal items with them during a trip or commute, and laying the personal items in a nearby seat or floor is undesirable. Under many circumstances, it would be desirable to hang the items up somewhere in the vehicle, but usually there are only a very limited number of places to hang an item. Most vehicles are equipped with an integrated hanger located above the rear side window, but hanging an article on such a hanger may block the driver's or passenger's field of view and normally places the item out of the reach of the driver during a trip or commute. The driver or passenger may also try to hang an item around one of the front seats or headrests, but this too could inadequate, since it may be inconvenient or uncomfortable for the person sitting in the seat and some personal effects simply cannot fit around these structures.

Other hanging systems for automobiles rely on inconvenient and extensive attachment mechanisms. The simpler attachment mechanisms require removal of the headrest for installation. Still others are bulky, metallic devices to withstand the weight of large heavy items and are inconvenient for normal articles that are carried on a day-to-day basis. The smaller, more convenient hanging devices do not possess the proper leverage to withstand heavier items.

For the foregoing reasons there is a need for a holding device for automobiles that is simple to install, convenient to use, aesthetically pleasing, and not cumbersome.

SUMMARY

The present invention is directed to a holder for personal effects in a vehicle. The holder comprises a base that fits around the support rods of a headrest, a mount that may adjustably connected to the base and designed to hold the strap or other hanging feature of one or more personal items, and at least one securement block that may be used to sure up the base, limit its ability to move laterally, or help it to support heavier items.

In some embodiments, the base may be detachable and reversible so that it can be used in combination with the headrest support rods of a seat on either side of the car and so that the arm can be positioned in a maximum number of variations for the convenience of the user. In some embodiments, one or more of the securement blocks is easily removable and re-attachable to the base to accommodate a large variety of headrest and support rod configurations.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
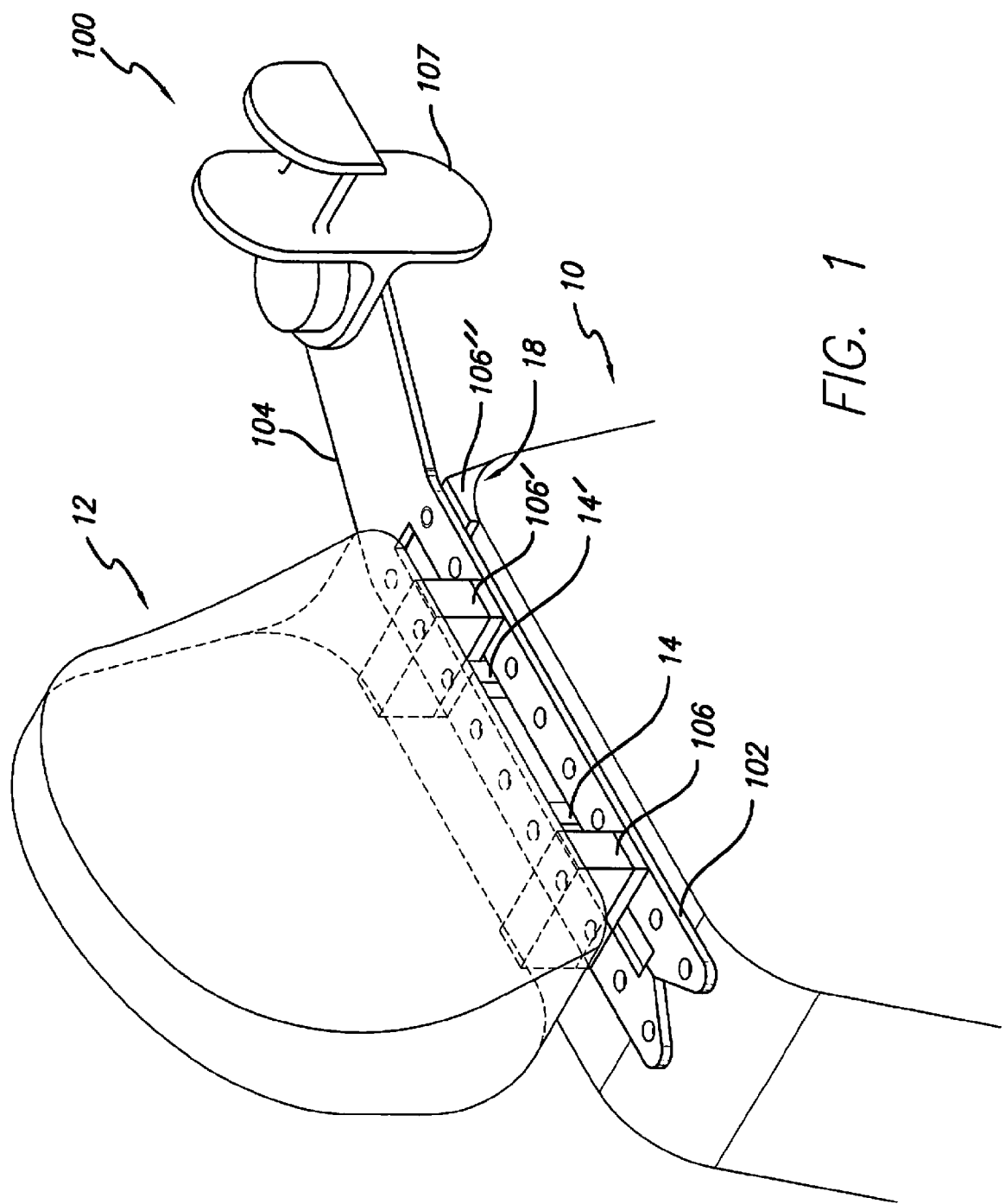
FIG. 1 is a perspective view of one embodiment within the scope of the present invention.
Figure 2:
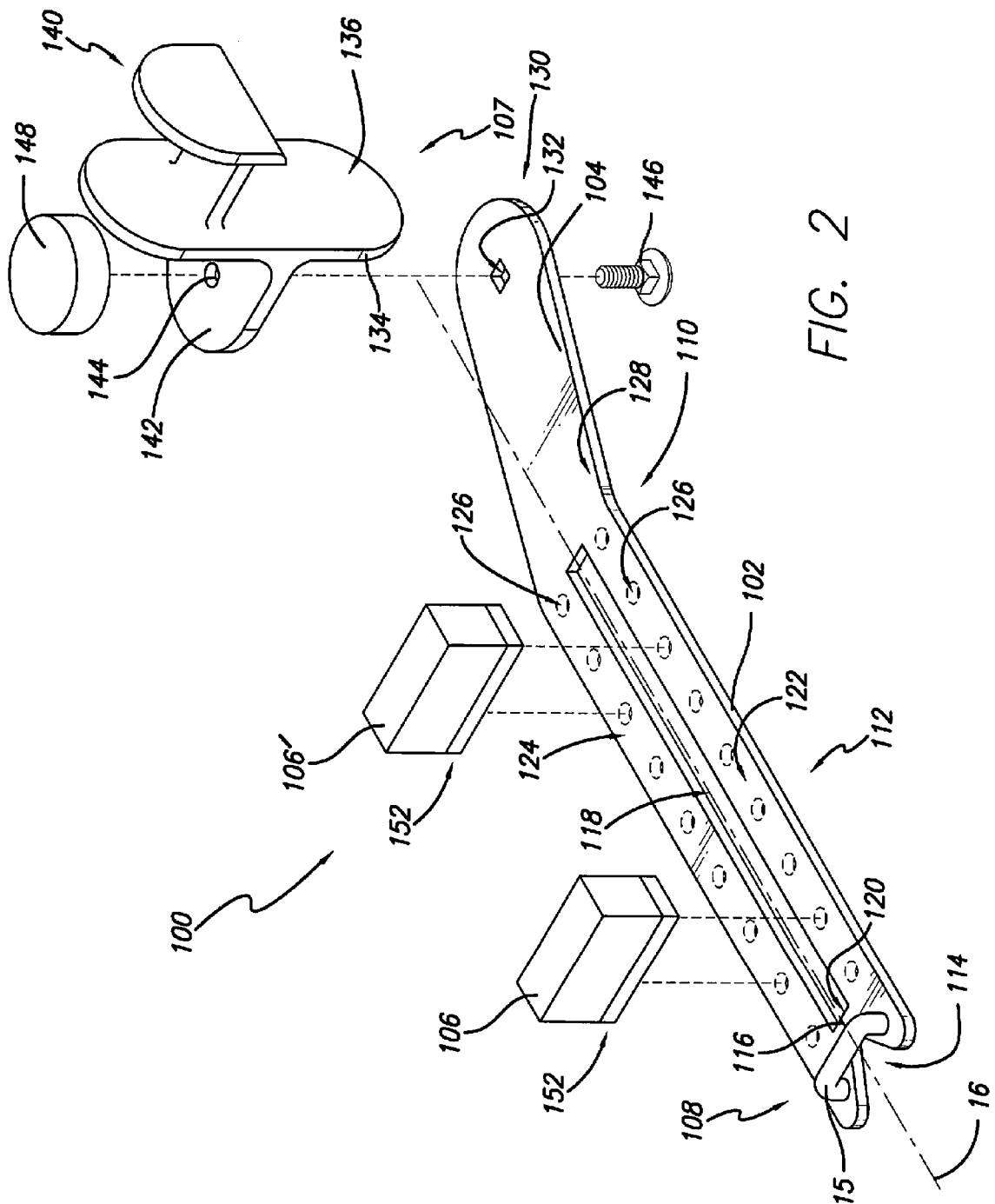
FIG. 2 is an exploded perspective view of one such embodiment.
Figure 3:
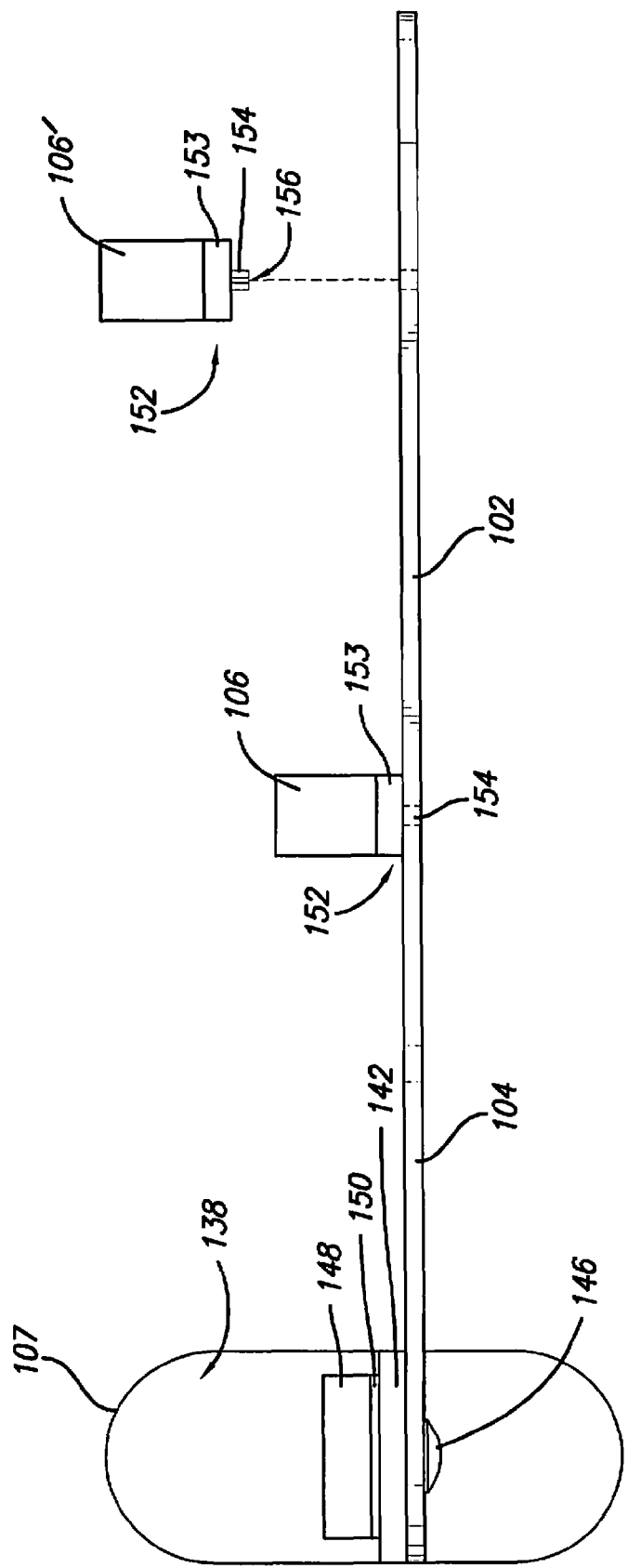
FIG. 3 is a side view of an embodiment in keeping with the present invention.

The present invention is versatile article holder 100 for use in automobiles. Referring to FIG. 1, the holder 100 can be secured between a backrest 10 and a headrest 12 of an automobile seat where it can provide a means for holding various articles, such as clothes, bags, purses, and the like. Referring to FIGS. 1 and 2, the holder 100 of the present invention comprises a base 102, an arm 104 protruding from the base 102, a mount 107 movably connected to the arm 104, and at least one securement block 106 attachable to the base 102. In general, the base 102 provides the foundational support for the mount 107, the arm 104 provides an extension from the base 102 to increase range and versatility of the holder 100, the mount 107 provides the means for holding an article, and the securement block 106 helps secure the base 102 in place.

The base 102 comprises a longitudinal axis 16, a first end 108, a second end 110 opposite the first end 108, and a middle portion 112 in between the first and second ends 108 and 110. The base 102 may be constructed of any sturdy and durable material such as plastic, wood, metal, and the like. The middle portion 112 comprises a first and second side having interior edges defining a gap 118. The first end 108 comprises an opening 114. Preferably, the opening 114 is a wedge-shaped opening or a "V"-shaped opening that ends at a split 116 in the base 102 leading into the gap 118 in the middle portion 112. The "V"-shaped design allows the support rods of a headrest, or rods 14, of a headrest 12 to be guided easily into the opening 114 where the support rods or rods 14 can be pushed passed the split 116 at the vertex of the "V" or wedge. As the rods 14 are pushed deeper into the "V" or wedge 114, the rods 14 gradually open the split 116. Once it has passed the split 116, the rods 14 become "trapped" in the gap 118 as the ledges 120 on the opposite side of the wedge prevents the rods 14 from passing back out of the gap 118 in the opposite direction.

In some embodiments, the opening 114 may have a closure 15. The closure may be a bar, rod, strap, clamp, elastic band, and the like to keep the split 116 in a closed state to facilitate the prevention of the base 102 from slipping out from the headrest rods 14.

Preferably the gap 118 is along the longitudinal axis 16, thereby separating the middle portion 112 into the first side 122 and second side 124. The width of the gap 118 is such that a headrest rod 14 can fit tightly inside the gap 118. In some embodiments, the gap 118 may have a means for conforming to the shape of the headrest rods 14. For example, the gap 118 may be ribbed with semi-circular concavities so as to allow cylindrical headrest rods 14 to fit inside the concavity. In some embodiments, the first and second sides 122, 124 may be lined with a plastic or elastic deformable material, such as foam, neoprene, rubber, and the like on the sides defining the gap 118 to sandwich or clamp the rods 14 between the two sides 122 and 124 with the closure 15 or the securement block 106.

In some embodiments, the first and second sides 122 and 124 of the middle portion 112 may be aligned with holes 126. Preferably, the holes 126 on the first side 122 are paired with holes 126 on the second side 124. These holes 126 may be through holes or incomplete holes, such as a divet or an indentation. In some embodiments, the holes 126 may be along the inner or outer edges of the first and second sides 122, 124. These holes 126 provide a means for fixing the securement blocks 106 in place. Therefore, the holes may be any geometric shape such as circular, ovoid, square, rectangular, triangular, star-shaped, and the like that can mate with a reciprocal peg or locating pin having the same shape. In some embodiments, the holes 126 may be elongated slots in which the locating pins can slide.

The second end 110 of the base 102 connects with the arm 104. The arm 104 comprises a proximal end 128 connected to the second end 110 of the base 102, and a distal end 130 opposite the proximal end 128. The distal end 130 may have a first orifice 132 through which the mount 107 may be adjustably attached.

In some embodiments, the arm 104 is integrally connected to the second end 110 of the base 102, thereby forming a single piece. In such embodiments, the arm 104 may be angularly offset from the longitudinal axis 16. In other words, the arm 104 may be bent relative to the base 102. This angular offset increases the versatility of positioning the article.

In some embodiments, the arm 104 may be adjustably attached to the base 102. For example, the arm 104 may be attached to the base 102 by a swivel, a hinge, a joint, or the like to allow lateral, vertical, or rotational movement. For example, the arm 104 can be rotated so as to be at right angles to the base 102, then swiveled downward so as to be parallel to the backrest 10. This positions the mount 107 closer to the floor so that heavier items with handles may rest on the floor but have their handles hooked onto the mount 107 to reduce sliding of the item across the floor and to make it easier to grasp the handles of the items for removal. In some embodiments, the arm 104 may be telescopic so as to adjust the length of the arm 104 to further increase the versatility of placement of the article.

The article hangs from the mount 107. The mount 107 may be movably connected to the distal end 130 of the arm 104. The mount 107 comprises a base wall 134 having a first surface 136 and a second surface 138 opposite the first surface 136. The first surface 136 may have a crook 140 so as to form a hook in conjunction with the first surface 136. In some embodiments, the first surface 136 may have a "T"-shaped crook 140 extruding from the first surface 136, thereby creating a double hook. The double hook facilitates the reversibility of the holder 100. In some embodiments, the mount 107 may be fixedly attached to the arm 104 or even integrally formed with the arm 104.

The second surface 138 may have a flange 142 extruding therefrom. The flange 142 may have a second orifice 144 that can align with the first orifice 132 of the arm 104. A bolt 146 may be inserted through first and second orifices 132 and 144 to secure the mount 107 to the arm 104 with a nut 148. Using a bolt 146 and nut 148 fastener allows the mount 107 to swivel, thereby creating a swivel hook. The nut 148 also serves as a clamp that may be tightened or loosened to immobilize or make rotatable, respectively, the swivel hook. Other fasteners known to those skilled in the art may be used to create a swivel hook. The mount 107 may have a washer 150 positioned between the nut 148 and the flange 142 to facilitate movement. In some embodiments, the washer 150 may be a shake-proof washer to absorb unwanted movements and vibrations.

Besides a nut 148 and bolt 146, the mount 107 may be fastened to the arm 104 in a variety of ways. For example, the mount 107 may be clamped on, screwed on, stuck on with adhesives, or fit on with resistance.

The securement block 106 secures the holder 102 in place on the backrest 10 of a seat with the aid of the headrest rod 14 and the headrest 12. The securement block 106 is a sturdy block of material that is positioned adjacent to a headrest rod 14, on top of or underneath the holder 100, and sandwiched between the headrest 12 and the backrest 10. The securement block 106 utilizes the compressive force exerted upon it by the headrest 12 to secure the holder 100 on to the backrest 10 and restrict vertical movement of the holder 100. Examples of material suitable for use as a securement block 106 include durable, pliable material, such as neoprene, foam, cork, rubber, and the like, or harder material, such as plastic, wood, metal, and the like.

In some embodiments, the securement block 106 comprises a fastening means 152 to fasten the securement block 106 to the base 102. The fastening means 152 may be a lockbar 153 with locating pins 154. The securement block 106 may be fastened to the lockbar 153 by a variety of means. Preferably, adhesives are used to fasten the securement block 106 to the lockbar 153. The locating pins 154 may be configured to fit resistively into the pair of holes 126 on the first and second sides 122 and 124 of the middle portion 112 of the base 102. The resistance or pressure created by forcing the locating pins 154 into the holes 126 creates a secure attachment, yet allows for quick and easy removal and attachment. Installation and removal of the securement blocks does not require removal of the headrest rods or any additional tools. Thus, the holder 100 can easily be adjusted to fit headrest holder of a variety of shapes and sizes, including non-traditional headrest rods, such as single block or elongated headrest rods. Using the securement blocks 106 also allows the holder to be quickly moved from seat to seat or from one orientation to another orientation. Thus, the mount may be positioned on the left or right sides of the car (laterally) or in the middle of the car (medially) from the driver's or passenger's seat.

In some embodiments, the locating pins 154 may have a longitudinal split 156 to allow the locating pins 154 to be compressible to facilitate insertion into the hole pair 126. In some embodiments, the locating pins 154 may be tapered to facilitate insertion into the holes pair 126. The securement block 106 can be moved along the base 102 and fit into any hole pair 126 to secure the securement block 106. The ease with which the securement blocks 106 can be moved improves the adjustability of the holder 100, thereby improving the variability of the overhang of the mount 107 off the backrest 10.

In some embodiments, locating pins 154 may protrude directly from the securement blocks 106 without the need for a lockbar 153. In some embodiments, the fastening means 152 may be a clamp, a clip, a bracket, a band, a magnet or any other fastener that can reversibly fasten the securement block 106 to the base 102 while immobilizing the first and second sides 122 and 124 relative to each other. For example, the fastener 152 may be a C-shaped clamp or bracket type device that clamps or fits around the outer edges of the first and second sides 122 and 124. In such embodiments the holes 126 would not be required on the first and second sides 122 and 124 and the securement block 106 could slide along the base 102 to be placed in the desired position.

In use, the holder 100 is passed along the backrest 10 so that the headrest rod 14 is passed through the opening 114 into the gap 118 to the desired position. Once the holder 100 is in position, at least one securement block 106 is inserted in between the holder 100 and the headrest 12 that is supported by the headrest rod 14. Preferably, the securement block 106 is positioned adjacent to the headrest rod 14 so that the securement block 106 prevents movement in at least one direction. The securement block 106 may be placed below the holder 100 between the holder 100 and the backrest 10 or above the holder 100 between the holder 100 and the headrest 12. In some embodiments, two or more securement blocks 106 and 106' may be utilized in a variety of configurations to secure the holder 100. For example two securement blocks 106 and 106' may be positioned on opposite sides but adjacent to the same headrest rod 14. If there are two headrest rods 14 and 14', the securement blocks 106 and 106' may be placed on the outer sides but adjacent to the two headrest rods 14 and 14', on the inner sides but adjacent to the headrest rods 14 and 14' or the same sides of the different headrest rods 14 and 14'. This reduces any lateral movement along the longitudinal axis 16 as any lateral movement in a first direction will be blocked by the first securement block 106 and any lateral movement in a second direction will be blocked by the second securement block 106'. A single securement block 106 may be used to buttress against a first headrest rod 14 and the second headrest rod 14' may be buttressed against the ledges 120 at the first end 108 or the second end 110 of the middle portion 102.

Once the securement block 106 is positioned, the headrest 12 can be lowered onto the securement block 106 to secure the securement block 106. The force created from the headrest 12 compressing the securement block 106 against the backrest 10 provides the resistance to keep holder 100 on the backrest 10 and limit vertical movement of the holder 100. With the securement block 106 in place, the article can be hung on the mount 107.

In some embodiments, the securement block 106 may be placed underneath the holder 100 between the holder 100 and the backrest 10 rather than on top of the holder. In some embodiments, the securement blocks 106 may be placed underneath and on top of the holder 100 to raise the headrest to a higher position to accommodate taller individuals.

In some embodiments, an additional securement block 106" may be used to increase the support provided by the holder 100. For example, a third securement block is 106" may be positioned anywhere under the headrest 12. In some embodiments, the additional securement block 106" may be positioned underneath the holder 100 buttressed against the shoulder 18 of the backrest 10 to provide additional support for the arm 104. In some embodiments, the additional securement block 106" may be configured to conform to the shoulder 18 of the back seat as shown in FIG. 1 so as to reduce forward and backward movement of the holder 10. For example, the block portion or foundation of the securement block may be curved or concave to conform to the curvature of the shoulder 18 of the backrest 10.

To accommodate different height positions of the headrest, the securement blocks 106 may come in variety of dimensions. In addition, the height of the headrest may be adjusted by placing a first securement block 106 above the holder and a second securement block 106' below the holder directly underneath the first securement block 106 so as to stack the securement blocks 106, 106' to raise the headrest 12.

To remove the holder 100, the headrest 12 is raised, the securement block 106 is removed, the first and second sides 122, 124 are slightly spread apart so that the headrest rod 14 can be slipped past the ledges 120 at the split 116.

Due to the flat characteristic of the holder 100, the holder 100 can be reversible. Thus, in embodiments with a fixed, bent arm, 104 the holder 100 can be flipped 180 degrees about the longitudinal axis 16 onto the opposite side if the user wants the bent arm 104 pointing in the opposite direction. In embodiments having a double hook, no further modifications need to be made on the mount 107. In embodiments with a single hook, the mount 107 can be removed easily and re-mounted on the opposite side. The features of the holder 100 also allow the holder to be rotated 180 degrees about an axis perpendicular to the longitudinal axis so that the arm may be directed medially or laterally relative to the car.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

INDUSTRIAL APPLICABILITY

This invention may be industrially applied to the development, manufacture, and use of a holder 100 for automobiles for the purpose of easily and conveniently hanging articles in an automobile. Such a holder 100 comprises a base 102 having a longitudinal axis 16, the base 102 comprising a first end 108, a second end 110 opposite the first end 108, and a middle portion in between the first end 108 and the second end 110. The first end 108 comprises a split 116 through which the holder 100 can be mounted onto a headrest rod 14. The middle portion 112 comprises a gap 118, separating the middle portion 112 into a first side 122 and a second side 124 in which the headrest rods 14 reside. An arm 104 protrudes from the second end 110 of the base 102 to provide clearance from the seat from which the holder 100 is supported. A mount 107 from which the articles may hang is movably connected to the arm 104. At least one securement block 106 is used to secure the holder 100 on the headrest rod 14 to provide a means to withstand the weight of heavier items.

While the present invention has been described with regards to particular embodiments, it is recognized that additional variations of the present invention may be devised without departing from the inventive concept.

What is claimed is:

1. A holder for hanging one or more personal items from a seat of a vehicle, comprising:
   a. a base having a longitudinal axis, the base comprising a first end, a second end opposite the first end, and a middle portion in between the first end and the second end, the middle portion having a first side and a second side opposite the first side, the first and second sides having inner edges defining a longitudinal gap for receiving a headrest support rod or rods of a seat of the vehicle, wherein the first end defines a split in communication with the longitudinal gap;
   b. an arm extending from the base and having a proximal end connected to the base and a distal end;
   c. a mount adjustably connected to the distal end of the arm; and
   d. two securement blocks, each comprising a pair of locating pins to removably attach to the holder and to restrict at least a lateral movement of the holder when attached,
   e. wherein the first and second sides comprise a plurality of paired holes intermittently spaced apart along the lengths of the first and second sides, and wherein the pair of locating pins are dimensioned to be inserted into any pair of the paired holes to reversibly secure the holder around the headrest rod or rods of the seat, to fix the position of the first and second sides relative to each other and to clamp the headrest support rod or rods in between the first and second sides.

2. The holder of claim 1, wherein at least one of the two securement blocks is positioned below the base to contact the seat and support the base near the arm while the arm is carrying heavy personal item.

3. The holder of claim 2, wherein the proximal end is integrally connected to the base and the arm is angularly offset from the longitudinal axis, the arm having a first orifice, wherein the mount comprises a base wall having a first surface and a second surface opposite the first surface, a crook on the first surface of the base wall to form a hook surface, and a flange extending out from the second surface, the flange comprising a second orifice.

4. A holder for an automobile, comprising:
   a. a base having a longitudinal axis, the base comprising a first end, a second end opposite the first end, and a middle portion in between the first end and the second end, wherein
      i. the first end defines an opening for receiving at least a first headrest rod, and
      ii. the middle portion comprises a first side and a second side opposite the first side, the first and second sides having inner edges defining a gap in communication with the opening;
   b. an arm extending from the base, the arm comprising a proximal end and a distal end;
   c. a mount movably connected to the arm; and
   d. at least one securement block comprising a fastening means to detachably connect to the holder to adjustably limit lateral movement of the holder along the longitudinal axis.

5. The holder of claim 4, wherein the first and second sides of the base are lined with a plurality of paired holes intermittently spaced apart along the length of the middle portion to resistively receive the fastening means of the securement block for secure attachment to the holder.

6. The holder of claim 5, wherein the fastening means is a pair of locating pins insertable into the paired holes for a resistive fit to secure the holder against at least the first headrest rod and allowing ready removal without removal of at least the first headrest rod for easy adjustment to different headrest rods.

7. The holder of claim 6, wherein the holder is flat so as to make the holder reversible to accommodate all seats in the automobile in various positions.

8. The holder of claim 4, further comprising an additional securement block positioned underneath the holder buttressed against a backrest of a seat of the automobile to provide additional support for the arm.

9. The holder of claim 4, wherein the at least one securement block comprises a concave foundation to conform to a backrest of a seat of the automobile to provide vertical support of the arm and limit a forward and backward movement of the holder.

10. The holder of claim 4, wherein the at least one securement block is a solid block positioned adjacent to the holder in between a headrest and a backrest that utilizes a compressive force between the headrest and the backrest to secure the holder onto the backrest to restrict vertical movement of the holder.

11. The holder of claim 4, wherein the proximal end is integrally connected to the base.

12. The holder of claim 11, wherein the arm is angularly offset from the longitudinal axis.

13. The holder of claim 4, wherein the mount is a swivel hook.

14. The holder of claim 13 further comprising a clamp to immobilize the swivel hook.

15. The holder of claim 4, wherein the opening is wedge-shaped to guide at least the first headrest rod into the gap through the opening, wherein the gap is closed by opposing ledges of the first and second sides at the first end, wherein the ledges prevent at least the first headrest rod from slipping out of the gap in a closed configuration.

16. A method of holding an article on a headrest rod of a seat in an automobile, comprising:
   a. providing a holder, the holder comprising:
      i. a base having a longitudinal axis, the base comprising a first end, a second end opposite the first end, and a middle portion in between the first end and the second end, wherein the first end comprises an opening and the middle portion comprises a first side and a second side having interior edges defining a gap,
      ii. an arm protruding from the base, and
      iii. a mount movably connected to the arm;
   b. passing the holder along the seat so that the headrest rod is passed through the opening into the gap;
   c. compressing at least one securement block and the holder in between a backrest and a headrest supported by the headrest rod to limit vertical movement of the holder, wherein the securement block is adjacent to the headrest rod to limit lateral movement of the holder in a first direction; and
   d. hanging the article on the mount.

17. The method of claim 16 further comprising attaching a second securement block onto the holder and adjacent to a second headrest rod to further limit lateral movement of the holder.

18. The method of claim 16 further comprising attaching a second securement block onto the holder and adjacent to a second headrest rod to further limit lateral movement of the holder in a second direction opposite the first direction.

19. The method of claim 16 further comprising attaching a second securement block underneath the holder that buttresses against the backrest to provide vertical support for the arm proximate the point where the arm extends from the base.

20. The method of claim 19, wherein the second securement block comprises a concave foundation to conform to the shape of a curved backrest to prevent a forward and backward movement of the holder.

21. The method of claim 16 further comprising attaching a second securement block adjacent to but on the opposite side of the at least one securement block to increase the height of the headrest.

22. The method of claim 16 further comprising:
   a. removing the at least one securement block from the holder without removing the headrest rod from the backrest;
   b. removing the holder from the headrest rod;
   c. rotating the holder 180 degrees about the longitudinal axis;
   d. passing the headrest rod through the opening into the gap; and
   e. securing the at least one securement block onto the holder adjacent to the headrest rod and the headrest to limit lateral movement of the holder with the holder in a new position.

23. The method of claim 16 further comprising:
   a. removing the at least one securement block from the holder without removing the headrest rod from the backrest;
   b. removing the holder from the headrest rod;
   c. rotating the holder 180 degrees about an axis perpendicular to the longitudinal axis;

d. passing the headrest rod through the opening into the gap; and
e. securing the at least one securement block onto the holder adjacent to the headrest rod and the headrest to limit lateral movement of the holder with the holder in a new position.

24. The method of claim 16 further comprising:
a. removing the at least one securement block from the holder without removing the headrest rod from the backrest;
b. removing the holder from the headrest rod;
c. attaching the holder onto a second headrest rod of a different seat by passing the second headrest rod through the opening into the gap; and
d. adjusting the at least one securement block onto the holder adjacent to the second headrest rod to limit lateral movement of the holder on the different seat.

* * * * *